(12) United States Patent
Braune

(10) Patent No.: US 6,778,092 B2
(45) Date of Patent: Aug. 17, 2004

(54) METHOD OF, AND APPARATUS FOR, CONTROLLING A SAFETY-SPECIFIC FUNCTION OF A MACHINE

(75) Inventor: Ingolf Braune, Gundelfingen (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 10/279,075

(22) Filed: Oct. 24, 2002

(65) Prior Publication Data

US 2003/0076224 A1 Apr. 24, 2003

(30) Foreign Application Priority Data

Oct. 24, 2001 (DE) .......................................... 101 52 543

(51) Int. Cl.$^7$ ............................................... G08B 21/00
(52) U.S. Cl. .................... 340/679; 340/680; 340/686.6; 340/552; 340/557; 250/221; 250/222.1; 250/559.38
(58) Field of Search ................................ 340/679, 680, 340/686.6, 557, 552; 250/221, 222.1, 559.38; 192/129 R, 129 A

(56) References Cited

U.S. PATENT DOCUMENTS

| 4,918,560 A | * | 4/1990 | Storer | 361/190 |
| 5,047,752 A | * | 9/1991 | Schorn | 340/680 |
| 5,083,298 A | * | 1/1992 | Citterio et al. | 367/96 |
| 5,280,622 A | | 1/1994 | Tino | |
| 6,108,071 A | * | 8/2000 | Landry et al. | 356/5.05 |
| 6,265,725 B1 | * | 7/2001 | Moll et al. | 250/559.38 |
| 6,297,844 B1 | | 10/2001 | Schatz et al. | |
| 2001/0041077 A1 | | 11/2001 | Lehner et al. | |

FOREIGN PATENT DOCUMENTS

| DE | 37 00 009 A1 | 7/1988 |
| DE | 44 17 128 A1 | 12/1995 |
| DE | 198 09 210 A1 | 9/1999 |
| DE | 199 38 639 A1 | 2/2001 |
| DE | 100 00 287 A1 | 7/2001 |
| EP | 0 179 252 A2 | 4/1986 |
| WO | WO 97/25568 A1 | 7/1997 |
| WO | WO 00/67932 A1 | 11/2000 |

* cited by examiner

*Primary Examiner*—Jeffery Hofsass
*Assistant Examiner*—Hung Nguyen
(74) *Attorney, Agent, or Firm*—Foley & Lardner LLP

(57) ABSTRACT

A method of controlling at least one safety-specific function of a machine. The method includes monitoring a monitoring region with at least one location-resolving and time-resolving sensor, where the monitoring region includes a safety boundary which separates off a danger region and defines a safe distance from a danger zone of the machine. The method also includes detecting at least one of a position, a movement direction and a movement speed of an object. The method also includes establishing a position of the safety boundary in a variable manner depending on the at least one of a detected position, movement direction and movement speed of the object. The method also includes triggering the safety-specific function of the machine when entry into the danger region by the object is detected. An apparatus corresponding to the method is also described.

13 Claims, 3 Drawing Sheets

METHOD OF, AND APPARATUS FOR, CONTROLLING A SAFETY-SPECIFIC FUNCTION OF A MACHINE

CROSS-REFERENCE TO RELATED PATENT APPLICATIONS

Federal Republic of Germany Priority Application 101 52 543.5, filed Oct. 24, 2001 including the specification, drawings, claims and abstract, is incorporated herein by reference in its entirety.

FIELD OF THE INVENTION

The invention relates to a method of controlling at least one safety-specific function of a machine, where a monitoring region is monitored by at least one sensor and the monitoring region comprises a safety boundary, and a safety-specific function is triggered when an object passes beyond the safety boundary. The invention also relates to an apparatus for implementing the method.

BACKGROUND OF THE INVENTION

In order to protect operators of potentially dangerous machines, such as, for example, presses, bending presses, robots and the like, various safety arrangements are known.

For example, in the simplest case, protection is provided by mechanically safeguarding access to, or intervention in, a danger region, for example by grilles or blocking fencing. A mechanical safeguard, however, also makes it more difficult to access machines in the danger area when the machines are at a standstill. As a result, optoelectronic protection arrangements are preferably used nowadays.

These optoelectronic protection arrangements may be constituted by a light-grille barrier which forms an optical access safeguard. Passage through the light-grille barrier triggers a safety-specific function of the machine, for example, stoppage of the machine.

Further optoelectronic protection arrangements are disclosed in WO 97/25568 and WO 00/67932. In order to protect fingers in bending presses, individual light barriers are arranged in the immediate vicinity of the bending tool. Thus, access to the press is ensured in principle and only the dangerous region in the immediate vicinity of the bending presses is protected by the light barriers.

All these optoelectronic protection systems have in common the fact that the boundary between the danger region, which is to be safeguarded, and a safe region is rigidly defined by a minimum distance from the area of potentially dangerous movement of the machine. When an object passes beyond this boundary, the safety-specific function, which typically means stoppage of the machine, is triggered. Since the machine requires a certain amount of time or distance to slow down, and the speed of the object which penetrates into the danger region is unknown, the protection arrangements (e.g. light barriers and light grilles) must be spaced from the actual danger zone by a sufficient distance. The spacing must be sufficient, for example, to ensure that even in the case of rapid movement, such as an operator falling, the machine still comes to a standstill in time before the operator could come into contact in anyway with the dangerous region of the machine. This safety arrangement does not distinguish between slow, careful movements of the operator and rash, and in some circumstances rapid, movements, which are more likely to result in an accident. For safety reasons the safety-specific function is always triggered.

SUMMARY OF THE INVENTION

According to one aspect the invention improved methods and apparatuses are provided by means of which the safety of a machine operator continues to be ensured and which trigger the safety-specific function in an improved manner taking into account the situation.

According to one embodiment of the invention, a method of controlling at least one safety-specific function of a machine is provided. The method comprises: monitoring a monitoring region with at least one location-resolving and time-resolving sensor, the monitoring region comprising a safety boundary which separates off a danger region and defines a safe distance from a danger zone of the machine; detecting at least one of a position, a movement direction and a movement speed of an object; establishing a position of the safety boundary in a variable manner depending on the at least one of a detected position, movement direction and movement speed of the object; and triggering the safety-specific function of the machine when entry into the danger region by the object is detected.

According to another embodiment of the invention, an apparatus for controlling at least one safety-specific function of a machine is provided. The apparatus comprises: at least one location-resolving and time-resolving sensor for monitoring an object in a monitoring region; an evaluating unit for determining at least one of a position, movement direction and movement speed of the object from sensor signals received from the at least one location-resolving and time-resolving sensor; a safety boundary unit for establishing a safety boundary in the monitoring region, the safety boundary separating off a danger region and defining a safe distance from the machine, the position of the safety boundary being established depending on the determined at least one of a position, movement direction and movement speed of the object; and a warning signal or switch for triggering the safety-specific function following a detected entry of the object into the danger region.

According to another embodiment of the invention a method of controlling at least one safety-specific function of a machine is provided. The method comprises: monitoring a monitoring region with at least one location-resolving and time-resolving sensor, the monitoring region comprising a safety boundary which separates off a danger region and defines a safe distance from a danger zone of the machine, and a safety region separate from the danger region; detecting at least one of a position, a movement direction and a movement speed of an object; establishing an extent of the safety region in a variable manner depending on the at least one of a detected position, movement direction and movement speed of the object; and triggering the at least one safety-specific function of the machine when entry into the safety region by the object is detected.

According to another embodiment of the invention an apparatus for controlling at least one safety-specific function of a machine is provided. The apparatus comprises: at least one location-resolving and time-resolving sensor for monitoring an object in a monitoring region; an evaluating unit for determining at least one of a position, movement direction and movement speed of the object from sensor signals received from the at least one location-resolving and time-resolving sensor; a safety boundary unit for establishing a safety boundary in the monitoring region, the safety boundary separating off a danger region and defining a safe distance from the machine; a safety region unit for establishing the extent of a safety region, separate from the danger region in the monitoring region, the extent of the safety region being established in a variable manner depending on the determined at least one of a position, movement direction and movement speed of the object; and a warning signal or switch for triggering the at least one safety-specific function following a detected entry of the object into the safety region.

BRIEF DESCRIPTION OF THE DRAWINGS

The invention is explained in detail hereinbelow by way of exemplary embodiments and with reference to the drawing, in which.

DETAILED DESCRIPTION OF THE PREFERRED EMBODIMENTS

Figure 1:
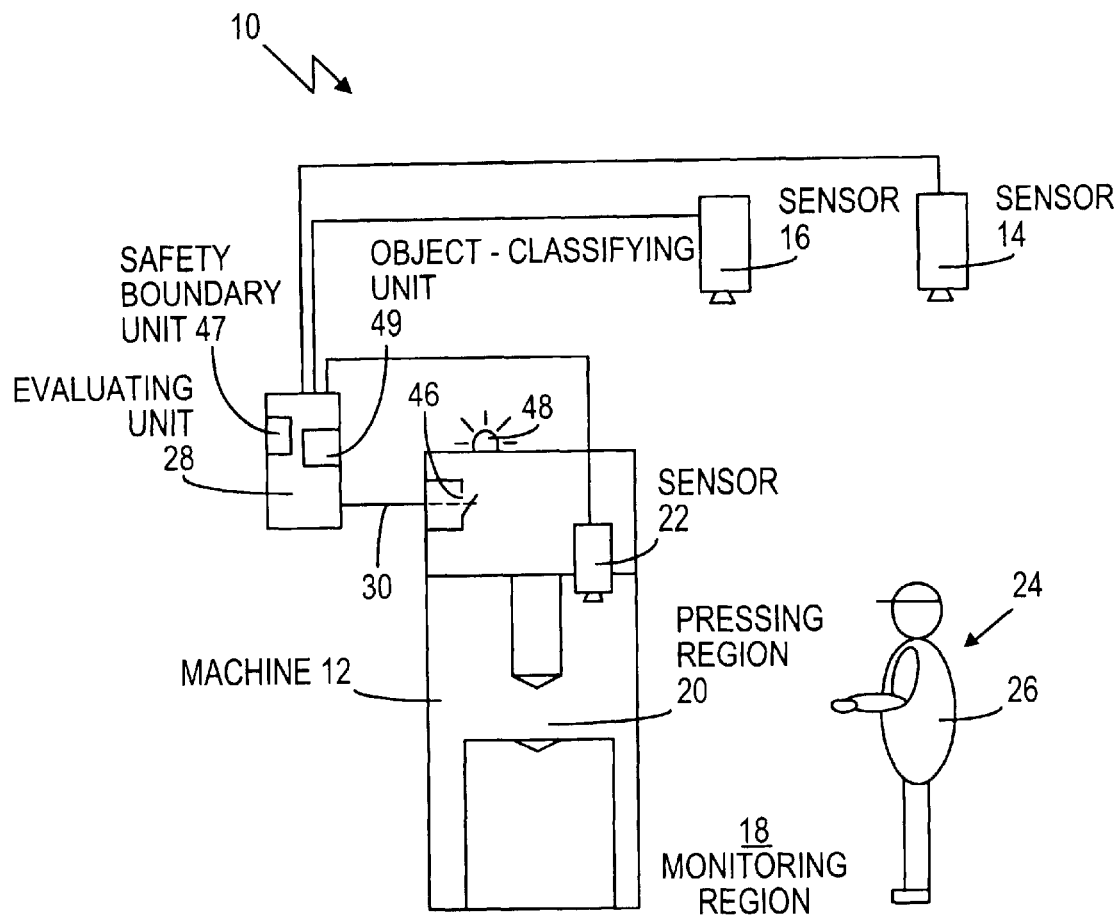
FIG. 1 shows a schematic illustration of an apparatus according to the invention on a bending press.

According to one embodiment of the invention, a region which is to be monitored is monitored by at least one location- and time-resolving sensor which detects the position, the movement direction and/or the movement speed of an object, such as, for example, an operator or individual limbs of the operator. Furthermore, a safety boundary is defined in a known manner in the monitoring region. The safety boundary separates off a danger region and establishes a safe distance as a minimum distance from the potentially dangerous movement of the machine. Penetration of the operator or individual limbs of the operator into the danger region triggers the safety-specific function. In this embodiment of the invention, it is possible for the position of the safety boundary, i.e., the safe distance from the potentially dangerous movement of the machine, to be established in a variable manner depending on the position, the movement direction and/or the movement speed of the monitored object.

The safety boundary and thus the extent of the danger region is no longer established in a rigid manner; rather, it is adapted in accordance with the spatial position of the operator and the movement of this individual. The situation-specific adaptation of the safety boundary allows the monitoring region, which usually includes an access region to the machine, to be utilized to considerably better effect since not every movement, even if it is executed in the vicinity of the machine, results in the safety-specific function being triggered. It is thus possible to slowly approach the danger zone, and thus the potentially dangerous movement of the machine is slowly braked. Completely stopping the machine need not be inevitable. A rapid approach may, however, trigger an emergency stop of the machine. It is also possible for a movement parallel to the danger zone or away from the danger zone to cause the machine to re-start, or at least not to trigger, the safety-specific function.

In addition, the safety-specific function may comprise various system reactions. It is possible, in the case of a movement in the direction of the danger zone which takes place at a relatively large distance from the danger zone, for merely an optical and/or acoustic warning to be produced. In the case of further approach, the potentially dangerous movement may be merely braked. In the case of still further approach, the braking may result in complete stoppage of the machine.

Overall, the method according to the invention can increase the machine-running time since, only detected situations that are actually potentially dangerous cause the machine to stop, whereas situations which have less potential for danger merely slow down the machine movement, and need not inevitably bring about an emergency stop of the movement.

According to another embodiment of a method, instead of a sharply defined safety boundary, a safety region with a finite extent is provided, where the extent of the safety region is established depending on the position, the movement direction and/or movement speed of the object in the monitoring region. The safety-specific function is only triggered when the object passes beyond the entire safety region. Entry into the safety region may trigger an optical and/or acoustic warning. As a result, in a manner similar to the first solution, the safety region can be adapted to the specific situation, with the same advantages.

It is also possible to combine the two embodiments, thus providing a safety region which can be adapted in its extent in a manner specific to the situation, and, in addition, where the position of the monitoring region, can be changed in a manner specific to the situation.

A speed at which the position of the safety boundary or of the safety region is displaced is advantageously dependent on the position, the movement direction and/or movement speed of the object in the monitoring region. It is thus possible, for example in the case of a slow movement of the object in the direction of the danger zone, for the safety boundary to be pushed forward slowly, in the direction of the danger zone, and in front of the object. Displacement need only to be stopped following approach to an extreme extent. Thus, further movement of the object in the direction of the danger zone would then trigger the safety-specific function.

In one embodiment of the invention, it is possible to classify the object in the monitoring region. It is thus possible to distinguish between an operator, for the protection of whom it is necessary to establish the safety boundary, and other objects, which are not at risk and for which it is not necessary to establish any safety boundary. An example of an object which is not at risk would be a materials-handling truck.

The safety-specific function of the machine is then controlled in dependence on the class of the object.

In another embodiment of the invention, the safety-specific function of the machine is advantageously adapted to the position, the movement direction and/or the movement speed of the object. It is thus possible, for example in the case where the object slowly approaches the danger region, for merely a warning sound to be produced. In the case of a rapid approach to the danger region, the warning sound may be intensified or it is even possible for the entire machine to change over to a safe state.

In an alternative embodiment, an apparatus for controlling the safety-specific function has a monitoring region in which an object can be monitored by at least one location- and time-resolving sensor. An evaluating unit can be used for determining the position, movement direction and/or movement speed of the object in the monitoring region from the sensor signals. The apparatus also includes a safety boundary unit for establishing the safety boundary, which can establish the position of the safety boundary in a monitoring region depending on the situation. Corresponding signaling and/or switching units are provided for triggering the safety-specific function.

The apparatus corresponding to the alternative embodiment differs merely in that the safety boundary unit for establishing the safety boundary may also, at the same time, establish the extent of the safety region depending on the situation. These safety boundary unit and safety region units for establishing the safety boundary and for establishing the extent of the safety region, respectively, may be constituted by a corresponding programmable circuit of the evaluating unit.

In one embodiment of the invention, the apparatuses include object-classifying unit for classifying objects. The safety-specific function of the machine can therefore be controlled depending on the class of the object. It is also possible for the object-classifying units to be integrated in the circuitry and/or programming of the evaluating unit.

Figure 2:
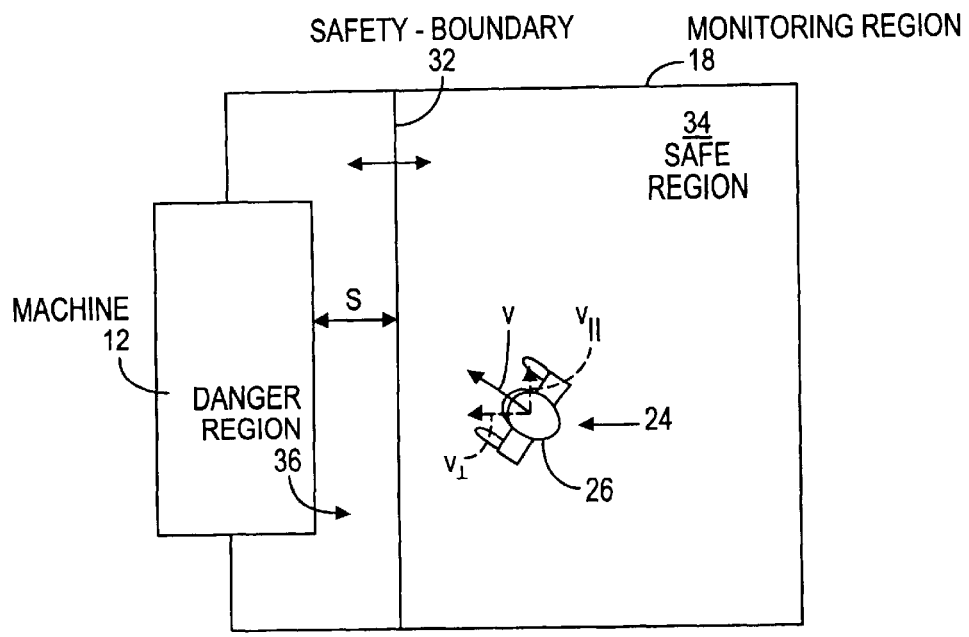
FIGS. 2 and 3 show a plan view of the situation illustrated in FIG. 1.
Figure 3:
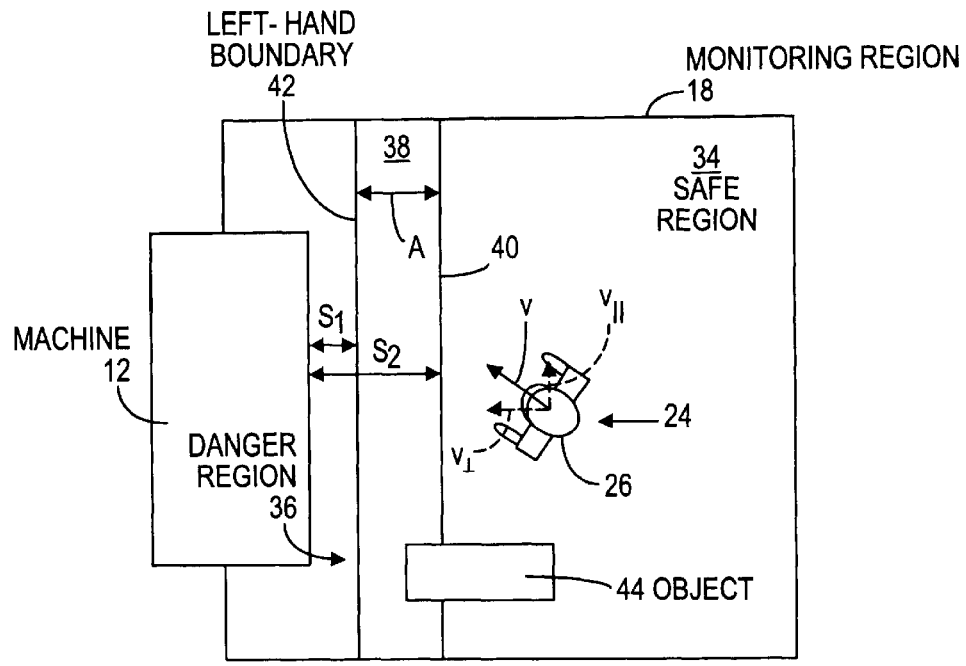

An apparatus 10 according to an embodiment the invention for controlling at least one safety-specific function of the machine 12, which in FIGS. 1 to 3 is illustrated as a bending press, has at least one location- and time-resolving sensor 14. The sensor 14 may be a camera or any other desired location- and time-resolving sensor, for example a laser scanner as is sold under the designation "PLS". If the sensors used are cameras, two cameras 14 and 16 may be provided in order to allow three-dimensional sensing of a monitoring region 18. At least one further sensor 22 could be arranged at specific danger zones, for example in the pressing region 20 of the machine 12.

An object 24, which in this embodiment is illustrated is an operator 26, is located in the monitoring region 18. The sensors 14, 16, 22 are connected, via signal lines, to an evaluating unit 28 in which the sensor signals can be evaluated. The evaluating unit 28 is connected to the machine 12 via a suitable connection 30 in order for it to be possible to control the triggering of at least one safety-specific function. The safety-specific function may be an emergency stop of the machine and/or an acoustic and/or optical warning signal. For this purpose, the machine 12 or the apparatus 10 has signaling and/or switching units, which may be, for example, an on-off switch 46, which is illustrated schematically in FIG. 1, and/or a warning light 48.

Further features of the apparatus according to embodiments of the invention as well as the methods according to embodiments of the invention which can be realized using the apparatus, will be explained hereinbelow, by way of the following function-related description, with reference to FIGS. 2 and 3.

FIGS. 2 and 3 illustrate a plan view of the operating region from FIG. 1, comprising the machine 12 and monitoring region 18. The apparatus 10 according to this embodiment with the sensors 14 and 16 and the evaluating unit 28 is not shown in FIGS. 2 and 3. FIGS. 2 and 3 thus show the image "seen" by the sensor 14 (or 16). The sensor 14 (or 16) is capable of sensing the entire monitoring region 18, in which the machine 12 and the individual 26 are also located. The sensor 14 and the evaluating unit 28 are designed with an imaging system so that it is possible to detect the individual 26 as an object which needs to be protected. The way in which such an object-detecting system can function in specific terms can be gathered from the prior art, for example DE 44 17 128 A1.

The monitoring region 18 is divided by a safety boundary 32, between a safe region 34 and a danger region 36, which is safeguarded by the safety boundary 32. If the individual 26 passes beyond the safety boundary 32 or reaches into the danger region 36, for example, with his/her arm, the evaluating unit 28 triggers the safety-specific function, for example an emergency stop of the machine 12, via the signaling and/or switching units 46 or 48.

The safety boundary 32, rather than being a physically detectable boundary, is established via corresponding safety boundary unit 47 in the evaluating unit 28, for example by software. The safety boundary unit 47 for establishing the safety boundary may comprise a programmable circuit. The safety boundary 32 is spaced by a safe distance S from the machine 12 and defines the extent of the danger region 36. According to this embodiment, the safe distance S, that is to say the position of the safety boundary 32 relative to the machine 12, can be established in a variable manner via the safety boundary unit 47 depending on the position, the movement direction and/or the movement speed v of the individual 26.

The position, movement direction and/or movement speed v of the individual 26 may be determined via the sensors 14 and 16 and the evaluating unit 28 in a known manner (see, for example, DE 44 17 128 A1). The movement speed v of the individual 26 is made up of a component $v_{\parallel}$ parallel to the machine 12 and a component $v_{\perp}$ perpendicular to the machine 12. A movement exclusively with a component $v_{\parallel}$ parallel to the machine cannot result in any danger. From the point of view of safety, it is only the components $v_{\perp}$, that is to say the effective approach speed, which is important. If $v_{\perp}$ is large, then the safe distance S should also be large. If, however, $v_{\perp}$ is small, i.e. the individual 26 is only moving slowly in the direction of the machine 12, the safety boundary 32 can be moved toward the machine 12. The speed at which the position of the safety boundary is displaced is preferably dependent, both on the position of the individual 26 and on the speed component $v_{\perp}$.

The illustration in FIG. 3 will be used to explain a further embodiment of the invention. In contrast to the preceding exemplary embodiment, in this case, rather than a sharply defined safety boundary being provided, a safety region 38 with an extent A in the direction perpendicular to the machine 12 is provided. The safe region 34 of the monitoring region 18 is located on one side of the safety region 38 and the danger region 36 is located on the far side of the safety region 38, with the result that, when an object enters the danger region 36, the machine is caused to change over to a safe state, for example, to a state where the machine 12 exhibits slow closing movement, via the switching means 46.

If the individual 26 merely enters into the safety region 38, that is to say merely passes beyond the right-hand boundary 40 of the safety region 38 according to FIG. 3, the signaling unit 48 may emit, for example, an acoustic and/or optical warning signal, which may be intensified as the left-hand boundary 42 of the safety region 38 is approached. The safety-specific function, which in the case of the press may be a slow closing movement, thus depends on the position of the movement direction and/or the movement speed v of the individual 26. The safe slow movement may be terminated if the individual 26, although still moving within the safety region 38, moves away from the machine 12, that is to say increases his/her distance from the machine 12.

Distances $S_1$ and $S_2$ of the left-hand and right-hand boundaries 42, 40, respectively, of the safety region 38 from the machine 12 may be established in a variable manner by the unit 47. These boundaries are preferably established depending on the position, the movement direction and/or the movement speed v of the individual 26. Thus, the extent A of the safety region 38 can be adapted in a manner specific to the situation and, the position of the safety region 38, i.e., the distance from the machine 12, can also be adapted in a manner specific to the situation.

Furthermore, FIG. 3 illustrates an object 44 which could be, for example, a materials-handling truck. If the object 44 penetrates into the safety region 38 or even into the danger region 34, the safety-specific function need not be triggered because the object 44 is not in any danger since the materials-handling truck 44 cannot penetrate into the pressing region 20 of the machine 12.

In order for it to be possible for this non-triggering function of the safety-specific function to be realized, the apparatus 10 according to this embodiment has an object-classifying unit 49, which may comprise suitable software and hardware integrated in the evaluating unit 28. The object-classifying unit 49 divides up the detected object 24 and 44 into classes. Thus, the safety-specific functions, for example, warning signals or emergency stops, can be controlled depending on the class of the object penetrating into the safety region 38 or the danger region 36. For this purpose, objects such as the materials-handling truck 44 are grouped into a class of objects which are not at risk, whereas individuals 26 detected according to this embodiment are grouped into a class of objects which are at risk, and for which it is necessary to establish the safety boundary 32 and/or the safety region 38.

Overall, the machine-running time is increased, and the production process area is utilized more effectively, as a result of these embodiments because, on the one hand, the extent of the safeguarded danger region 36 can be adapted in a manner specific to the situation, and not every movement which is executed by an individual or some other object in the vicinity of the machine necessarily brings about an emergency stop of the machine. Furthermore, on the other hand, not every case of an object entering into the danger region 36 brings about an emergency stop.

Figure 4:
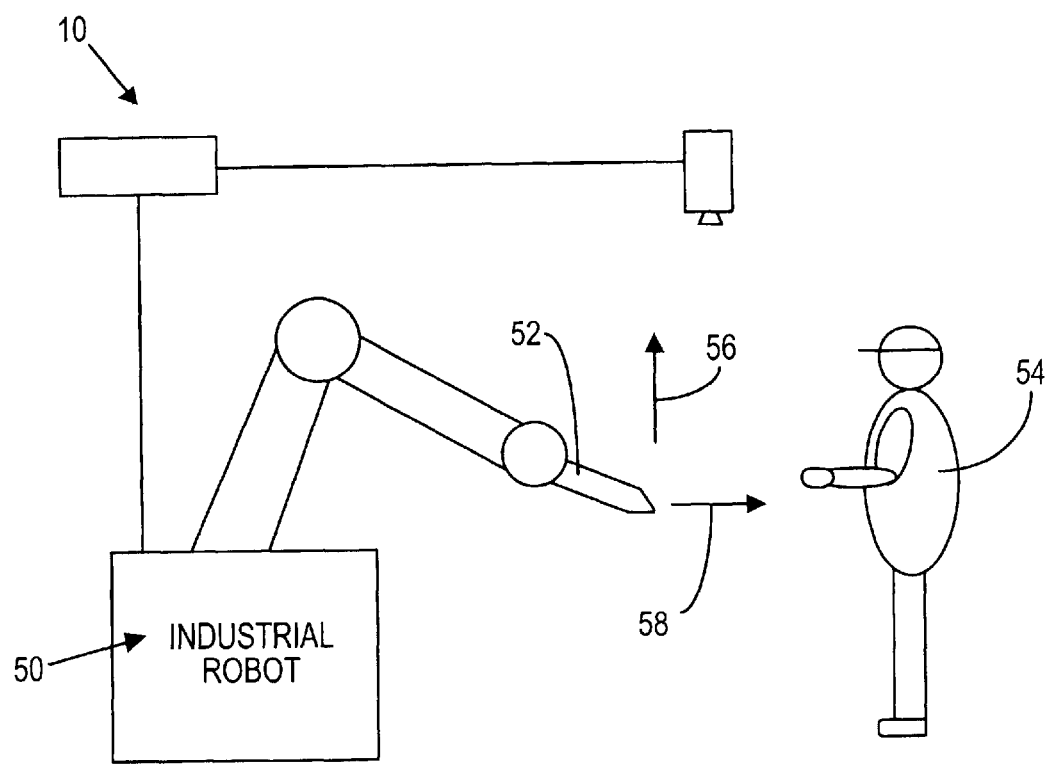
FIG. 4 shows a schematic illustration of an operating situation in which an industrial robot and an individual are involved.

The embodiment of the invention can be used with an extremely wide range of different machines. For example, the machine may be an industrial robot 50, as is illustrated schematically in FIG. 4. In this case, it is possible for the apparatus according to the embodiments of the invention to sense a pivoting region of the robot arm 52, the position of the robot arm 52, the movement direction 56, 58 and movement speed of the robot arm 52. At the same time, it is possible to detect the position, the movement direction and movement speed of an individual 54 working in the region of the robot 50. The apparatus 10 according to embodiments of the invention can control the activity of the robot from the point of view of safety, thus ensuring that the robot 50 and individual 54 never come into contact, and the individual 54 located in the vicinity of the robot arm 52 is never injured. Thus, there is no need for the robot 50 to be secured over a large area by a blocking zone. Rather with the apparatus 10 according to embodiments of the invention, it is possible for the protection region around the robot arm 52 to be established in a variable manner which adapts to the situation and which "moves along" with the robot arm 52. This allows improved operation in the region of an industrial robot and safe cooperation of the robot 50 and the individual 54.

It is clear from this example that the form of the safety boundary and/or of the safety region may be configured to adapt to specific machines, such as a bending press or industrial robot.

What is claimed is:

1. A method of controlling at least one safety-specific function of a potentially dangerous machine and protecting an object to be protected from the danger of the machine, comprising:

monitoring a monitoring region with at least one location-resolving and time-resolving sensor, the monitoring region comprising a safety boundary which separates off a danger region and defines a safe distance from a danger zone of the machine;

detecting a position, a movement direction and a movement speed of the object;

establishing a position of the safety boundary in a variable manner depending on the detected position, movement direction and movement speed of the object; and triggering the at least one safety-specific function of the machine when entry into the danger region by the object is detected.

2. The method as claimed in claim 1, wherein a speed at which the position of the safety boundary is displaced depends on the detected position, movement direction and the movement speed of the object.

3. The method as claimed in claim 1, wherein the monitoring region comprises a safety region separate from the danger region, the method further comprising:

establishing an extent of the safety region in a variable manner depending on the detected position, movement direction and movement speed of the object.

4. The method as claimed in claim 1, wherein the object is classified by an object-classifying unit.

5. The method as claimed in claim 4, wherein the at least one safety-specific function of the machine is controlled depending on the class of the object.

6. The method as claimed in claim 1, wherein the at least one safety-specific function of the machine is controlled depending on the detected position, movement direction and movement speed of the object.

7. A method of controlling at least one safety-specific function of a potentially dangerous machine and protecting an object to be protected from the danger of the machine, comprising:

monitoring a monitoring region with at least one location-resolving and time-resolving sensor, the monitoring region comprising a safety boundary which separates off a danger region and defines a safe distance from a danger zone of the machine, and a safety region separate from the danger region;

detecting a position, a movement direction and a movement speed of the object;

establishing an extent of the safety region in a variable manner depending on the detected position, movement direction and movement speed of the object; and triggering the at least one safety-specific function of the machine when entry into the safety region by the object is detected.

8. An apparatus for controlling at least one safety-specific function of a potentially dangerous machine and protecting an object to be protected from the danger of the machine, comprising:

at least one location-resolving and time-resolving sensor for monitoring the object in a monitoring region;

an evaluating unit for determining a position, movement direction and movement speed of the object from sensor signals received from the at least one location-resolving and time-resolving sensor;

a safety boundary unit for establishing a safety boundary in the monitoring region, the safety boundary separating off a danger region and defining a safe distance from the machine, the position of the safety boundary being established depending on the determined position, movement direction and movement speed of the object; and a warning signal or switch for triggering the at least one safety-specific function following a detected entry of the object into the danger region.

9. The apparatus as claimed in claim 8, further comprising:
a safety region unit for establishing the extent of a safety region, separate from the danger region in the monitoring region, the extent of the safety region being established in a variable manner depending on the determined position, movement direction and movement speed of the object.

10. The apparatus as claimed in claim 8, further comprising:
a unit for controlling the at least one safety-specific function of the machine depending on the determined position, movement direction or movement speed of the object.

11. The apparatus as claimed in claim 8, further comprising:
at least one object-classifying unit for classifying the object.

12. The apparatus as claimed in claim 11, further comprising:
a unit for controlling the safety-specific function of the machine depending on the class of the object.

13. An apparatus for controlling at least one safety-specific function of a potentially dangerous machine and protecting an object to be protected from the danger of the machine, comprising:
at least one location-resolving and time-resolving sensor for monitoring the object in a monitoring region;
an evaluating unit for determining a position, movement direction and movement speed of the object from sensor signals received from the at least one location-resolving and time-resolving sensor;
a safety boundary unit for establishing a safety boundary in the monitoring region, the safety boundary separating off a danger region and defining a safe distance from the machine;
a safety region unit for establishing the extent of a safety region, separate from the danger region in the monitoring region, the extent of the safety region being established in a variable manner depending on the determined position, movement direction and movement speed of the object; and
a warning signal or switch for triggering the at least one safety-specific function following a detected entry of the object into the safety region.

* * * * *